Figure 3:
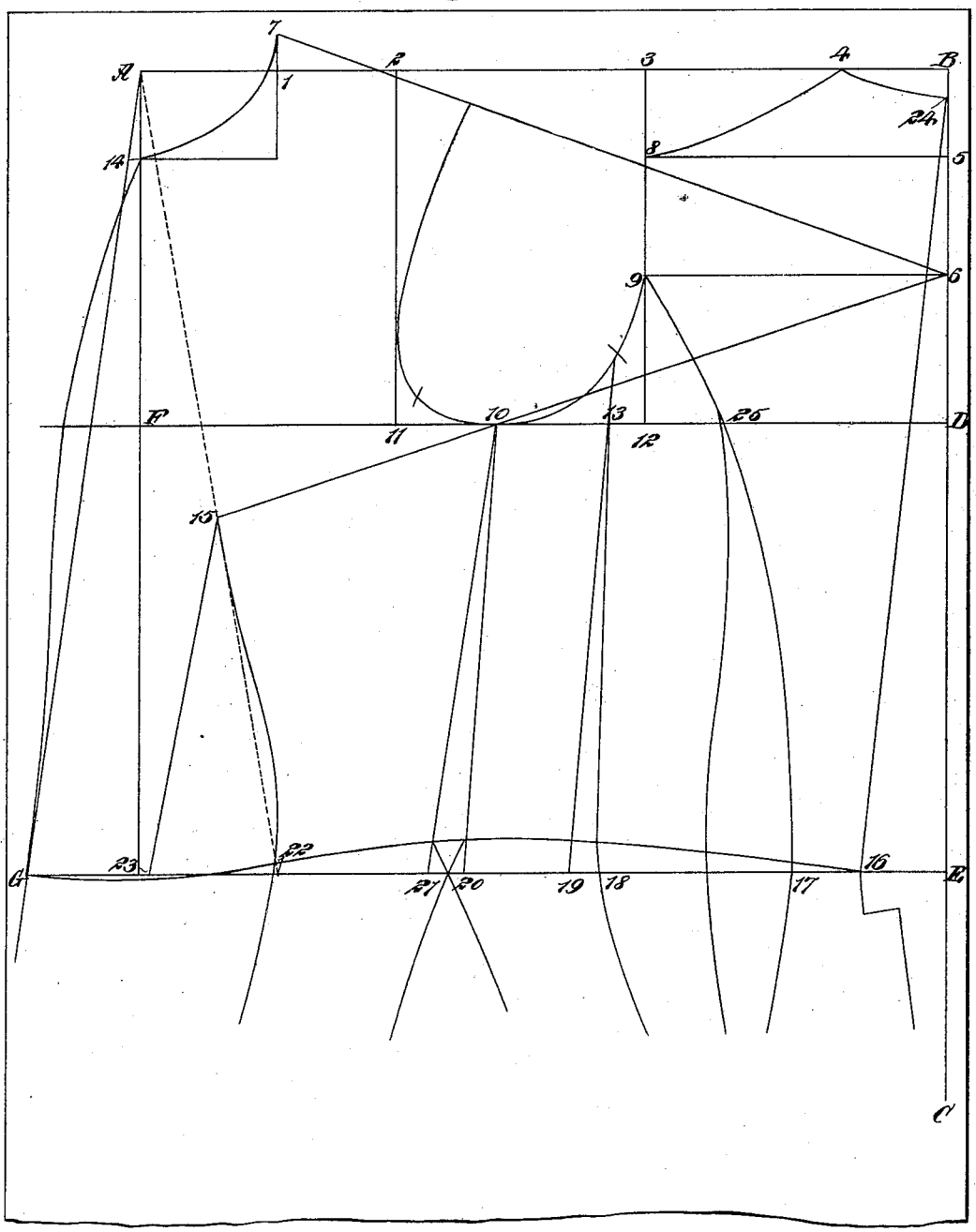

No. 651,208. Patented June 5, 1900.
D. SEBASTIANO.
TAILOR'S SQUARE.
(Application filed Aug. 17, 1899.)
(No Model.) 2 Sheets—Sheet 1.
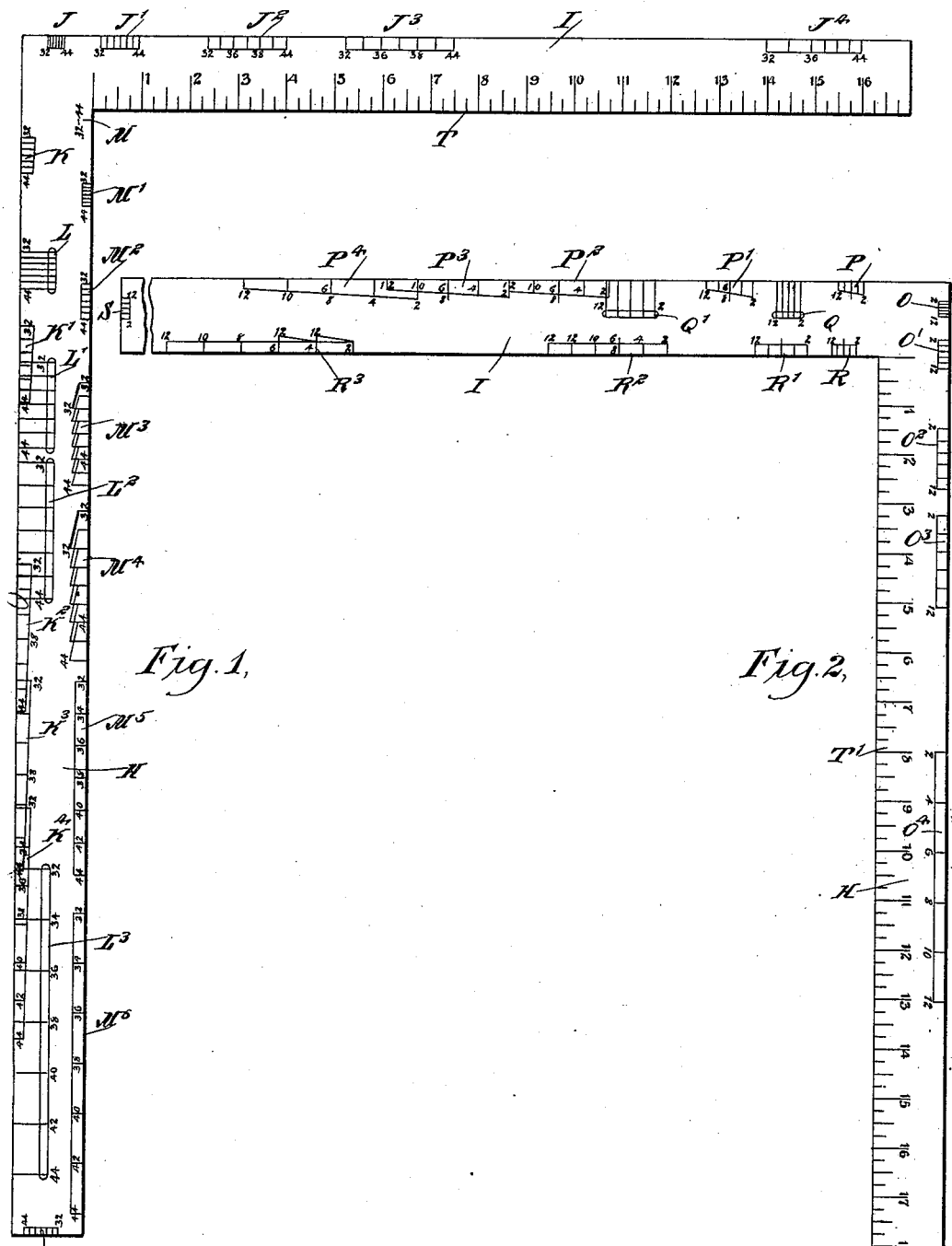
WITNESSES:
Edward Thorpe
H. L. Reynolds.
INVENTOR
D. Sebastiano
BY
ATTORNEYS

UNITED STATES PATENT OFFICE.

DOMENICO SEBASTIANO, OF NEW YORK, N. Y.

TAILOR'S SQUARE.

SPECIFICATION forming part of Letters Patent No. 651,208, dated June 5, 1900.

Application filed August 17, 1899. Serial No. 727,535. (No model.)

*To all whom it may concern:*

Be it known that I, DOMENICO SEBASTIANO, of the city of New York, borough of Manhattan, in the county of New York and State of New York, have invented a new and Improved Garment-Cutting Square, of which the following is a full, clear, and exact description.

My invention relates to an improvement in devices for laying out garments and patterns therefor; and it consists of a square having groups of marks arranged thereon in such a manner that the essential points of a garment may be located and the garment outlined by properly connecting these points.

My invention comprises the novel features, which are hereinafter described and claimed.

Reference is to be had to the accompanying drawings, forming a part of this specification, in which similar characters of reference indicate corresponding parts in all the figures.

Figure 1 is a face view of one side of the square. Fig. 2 is a face view of the other side of the square; and Fig. 3 is a view of a chart, showing the manner of laying out a pattern or garment.

The square, as herein shown, has upon one face thereof the proper scale or groups of marks, which are adapted for use in laying out patterns of certain sizes, and the opposite side is adapted for use in laying out patterns of another series of sizes. The use of the device for the different sizes is substantially the same. One blade of the square—as, for instance, the blade I—is used for laying out the positions of certain reference-lines or lines which extend across the pattern and which locate certain positions upon the garment—for instance, the bottom of the arm-opening and the waist-line. The other blade of the square is laid out with groups of marks arranged in plural series, the groups of each series being used for locating points upon the cross-lines, which are located by the marks upon the other blade of the square. The marks of each group are so placed with reference to the corner-angle of the square as to locate corresponding patterns for garments of different sizes.

The device is used in the following manner: The square is first placed upon the cloth or the sheet of paper from which the pattern is to be made and the two coördinate axes laid out by marking along the two outer edges of the square. These two lines are shown at A B and B C. These two lines form the coördinate axes, from which the measurements are taken for locating the various points of a pattern. Along the line B C, which is a vertical line of the pattern, is placed the blade I of the square. It will be noted that each of the groups J J' J² J³ J⁴, which are located along this edge of the square, contains the same number of marks, the marks corresponding with the size of pattern with which they are to be used. If, for instance, a "36" pattern is to be laid out, the marks in each one of these groups, which are to be used, is the mark which is opposite the figure "36." When the square has been placed in position, the marks corresponding with the size of the pattern in each one of the groups J, J', J², J³, and J⁴ are used for locating points upon the line B C. The group J is used for laying out the point 24 upon this line. The group J' locates the point 5, the group J² locates the point 6, the group J³ locates the point D, and the group J⁴ locates the point E, which is the waist-line. While the square is in this position, it is also used for locating points upon the line A B at the top of the pattern. For this purpose the groups of marks K, K', K², K³, and K⁴ are used. These groups of marks are distinguished from the next or central groups of marks by lying closer to the edge of the square and by the fact that the central groups of marks L, L', L², and L³ have two parallel lines extending longitudinally of this blade H of the square across their inner ends. Any mark by which the two groups may be readily distinguished will answer. The proper mark in each of the groups K K', &c., is used to locate a point along the line A B. In this manner the points A, 1, 2, 3, and 4 are located. The square is then moved down to the point 5, which has been located on the line B C, and a horizontal line is drawn through said point 5, and on this horizontal line the points 8 and 14 are located by perpendicular lines drawn through the points 3 and A, respectively. The intersection of a horizontal line through the point 6 with the continuation of the perpendicular line 3 8 locates the point 9 upon the armhole. The square is then dropped to the point D and the horizontal line D F drawn, which locates the bottom of the armhole and the upper ends of two darts. The square is then dropped to the point E and the horizontal line E G drawn, which approximately locates the waist-line.

When the square is upon the line D F, the central series of groups L, L', $L^2$, and $L^3$ are used to locate the points 25, 13, 10, and F. The point 25 is used for locating the curve connecting the points 17 and 9. The points 10 and 13 locate the upper ends of the two darts. The points 11 and 12 are located on the line D F by perpendicular lines drawn through the points 2 and 3, respectively.

While the square is upon the line E G or the waist-line, the inner groups of marks M, M', $M^2$, &c., are used for locating the points 16, 17, $17^a$, 18, 19, 20, 21, 22, and G. A perpendicular line is also drawn with the square through the point 1, and the point 7 is located by using the supplementary scale N, which is placed upon the end of the blade of the square. The curve connecting the points 7 and 14 is then put in by the eye, as is also the curve of the armhole, points for the same being furnished by the lines 3 12 2 11 and by the points 9 and 10. A line is then drawn connecting the points 6 and 7, which locates a portion of the upper border-line of the pattern. The points 8 4 and 4 24 are then connected by curved lines, which indicate the margin of another portion of the top of the pattern.

The intersection of a line drawn through the points 6 10 and between the points A and 22 will locate the point 15. Lines drawn from the points 10 and 13, respectively, to the points 21 20 and 19 18 will locate the two side darts, while lines drawn from the point 15 to the points 23 22 will locate another dart. The line connecting the points 15 and 22 should be curved after the manner indicated in the chart. A line is also drawn connecting the points 24 and 16, which indicates the back. As the line E G represents the waist-line, the continuation of the waist below this point may be made as much or as little, as desired.

It is evident that with a square laid off after the manner described a pattern may be readily cut of any size desired and different squares may be laid off for use in cutting different garments. With such a square it would be a simple matter for any person to learn how to use it to cut a garment.

It will be noticed that in the groups $M^3$ and $M^4$ the inner ends of the various lines are connected in pairs by diagonal lines. In this case both of the lines which have the same number marked opposite them are to be used for the same-sized garment. These two groups of lines are used for locating the points 18 19 and 30 21 to represent the sides of the dart. In case a garment did not have these darts a single line would be used in these groups as in the other groups. The same feature is shown at $R^3$ in Fig. 2, in which one size of the garment for which this side of the scale is laid out is provided with darts, while the other sizes are not provided with darts. Upon this side of the scale the groups of marks O, O', $O^2$, $O^3$, and $O^4$ are used for obtaining the position of the various points upon the garment, while the groups P, P', $P^2$, $P^3$, and $P^4$ are used for obtaining the position of points on the horizontal axis, which is located at the top of the garment, while the groups Q and Q' are used for obtaining the position of points on the central horizontal line and the groups R, R', $R^2$, and $R^3$ for obtaining the position of points on the waist-line.

The scale S, located at the end of one blade of the square, is used for obtaining the location of the point corresponding to the point 7 in the chart, Fig. 3. The two edges of the scale which are not provided with marks of this character are preferably laid out in inches, as shown at T and T'.

It will be observed that my improved square contains a large number of scales, some of which are related to each other, in that they are adapted to locate points on the same line. It would obviously be confusing and liable to lead to mistakes if all the scales were similar to each other. For this reason I have applied the same or substantially the same distinguishing-mark to all scales of the same group or series and different marks to scales of different series. Thus the scales K K' $K^2$ $K^3$ $K^4$ are distinguished by an oblique line at the inner ends of their graduations, so that it will be easy for the operator to mark the five points corresponding to these scales on the same reference-line of the pattern. The scales L L' $L^2$ $L^3$ are distinguished by a double line, the scales M M' $M^5$ $M^6$ by a single line parallel to the edge, while the scales $M^3$ $M^4$ have a slightly-different mark; but as these are the only scales along this edge of the square no mistake is possible. The advantage of these identifying-marks will be obvious.

Having thus fully described my invention, I claim as new and desire to secure by Letters Patent—

1. A square for laying out garments and patterns therefor, having two blades with series of marks arranged in groups or scales along the longitudinal edges of the blades, sundry of the scales on one blade being adapted for the location of reference-points on one of two coördinate axes, and sundry of the scales on the other blade being adapted for the location of reference-points on the other coördinate axis, while the remaining scales are adapted for the location of points upon auxiliary lines drawn through points located by the first-mentioned scales, the scales being different, but numbered alike to enable the operator to readily ascertain which points of the several scales correspond to each other.

2. A square for laying out garments and patterns therefor, having series of marks arranged in groups or scales along the longitudinal edges of the square's blades, the scales being different, but numbered alike to enable the operator to readily ascertain which points of the several scales correspond to each other, sundry of said scales having a double series of marks, that is, two marks for each designation or numeral, and each two such corresponding marks being connected by a suitable line.

3. A square for laying out garments and patterns therefor, having two blades with series of marks arranged in groups or scales along the longitudinal edges of the blades, sundry of the scales on one blade being adapted for the location of reference-points on one of two coördinate axes, and sundry of the scales on the other blade being adapted for the location of reference-points on the other coördinate axis, while the remaining scales are adapted for the location of points upon auxiliary lines drawn through points located by the first-mentioned scales, the scales being different, but numbered alike to enable the operator to readily ascertain which points of the several scales correspond to each other, sundry of said scales having a double series of marks, that is, two marks for each designation or numeral, and each two such corresponding marks being connected by a suitable line.

DOMENICO SEBASTIANO.

Witnesses:
ALFRED H. DAVIS,
EVERARD BOLTON MARSHALL.